(12) United States Patent
Shimizu et al.

(10) Patent No.: US 9,426,273 B2
(45) Date of Patent: Aug. 23, 2016

(54) PROGRAM EXPANDING SYSTEM, SERVER FOR USE THEREIN, PROGRAM EXPANDING METHOD AND PROGRAM MANAGING PROGRAM

(71) Applicant: Clarion Co., Ltd., Saitama-shi, Saitama (JP)

(72) Inventors: Atsushi Shimizu, Tokyo (JP); Takashi Matsumoto, Tokyo (JP); Takaaki Sekiguchi, Tokyo (JP); Mitsunori Maru, Tokyo (JP); Qingzhu Duan, Tokyo (JP); Haruhiko Sawajiri, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 118 days.

(21) Appl. No.: 14/155,418

(22) Filed: Jan. 15, 2014

(65) Prior Publication Data
US 2014/0242969 A1     Aug. 28, 2014

(30) Foreign Application Priority Data

Feb. 27, 2013    (JP) ................................. 2013-037215

(51) Int. Cl.
| | |
|---|---|
| *H04M 3/00* | (2006.01) |
| *H04M 1/725* | (2006.01) |
| *G06F 9/44* | (2006.01) |
| *G06F 9/445* | (2006.01) |
| *H04M 1/60* | (2006.01) |

(52) U.S. Cl.
CPC ......... *H04M 1/72525* (2013.01); *G06F 9/4411* (2013.01); *G06F 9/44526* (2013.01); *H04M 1/6075* (2013.01)

(58) Field of Classification Search
CPC ........................ H04M 1/72525; H04W 8/245
USPC ............ 455/419, 569.2, 556.1, 414.1, 414.2; 709/204; 705/40
See application file for complete search history.

(56) References Cited

U.S. PATENT DOCUMENTS

| | | | |
|---|---|---|---|
| 2003/0055924 | A1 | 3/2003 | Matsugatani et al. |
| 2005/0027653 | A1* | 2/2005 | Greenway .............. G06Q 10/10 705/40 |

(Continued)

FOREIGN PATENT DOCUMENTS

| | | |
|---|---|---|
| JP | 2008537452 A | 9/2008 |
| WO | 2006/116026 A2 | 2/2006 |

OTHER PUBLICATIONS

European Search Report dated Jan. 21, 2015 (10 pages) for Application No. 14151169.1.

*Primary Examiner* — Chuck Huynh
(74) *Attorney, Agent, or Firm* — Volpe and Koenig, P.C.

(57) ABSTRACT

A program manager operating on a smartphone transmits information of an onboard apparatus and a program ID list of the smartphone to the server. The server determines the possibility of an expansion of one or more programs, and the difference between charge/free provisioning of the program. If a function expansion condition of the program is met, the server transmits it to the smartphone. The program manager of the smartphone inquires as to possibility/impossibility of expansion, and a password (when there is a charge), and transmits the authentication information and the password (if there is a charge), which are produced from an onboard apparatus ID, a random number, secret data unique to the onboard apparatus, etc., to the server. The server transmits function expansion data to the smartphone, when succeeding the authentication, and the program management portion executes the function expansion of the program.

14 Claims, 16 Drawing Sheets

(56) References Cited

U.S. PATENT DOCUMENTS

| | | |
|---|---|---|
| 2006/0258342 A1 | 11/2006 | Fok et al. |
| 2010/0037057 A1 | 2/2010 | Shim et al. |
| 2013/0198021 A1* | 8/2013 | Gandhi .................. G06Q 30/06 705/26.1 |
| 2014/0162623 A1* | 6/2014 | Nagai .................. H04M 1/7253 455/419 |

* cited by examiner

FIG. 6

| ONBOARD APPARATUS ID | FUNCTION EXPANSION TARGET PROGRAM | FOR CHARGE(○)/FREE(×) |
|---|---|---|
| 11111111AAAAAAAA 0000000000000001 | PROGRAM "A" | × |
| | PROGRAM "B" | × |
| | PROGRAM "C" | × |
| 22222222BBBBBBBB 0000000000000002 | PROGRAM "A" | ○ |
| | PROGRAM "B" | × |
| 22222222FFFFFFFF 0000000000000003 | PROGRAM "A" | ○ |
| | PROGRAM "B" | ○ |
| ... | ... | ... |

FIG. 7

| 11111111AAAAAAAA0000000000000001 |
| 22222222BBBBBBBB0000000000000002 |
| ⋮ |

DIGITS 1 THROUGH 8 : MODEL
DIGITS 9 THROUGH 16 : DESTINATION (COMPANY/AREA)
DIGITS 17 THROUGH 32 : UNIQUE ID OF ONBOARD APPARATUS 2

FIG. 8

| USER ID | ONBOARD APPARATUS ID | SIMPLE PASSWORD | CREDIT CARD NUMBER |
|---|---|---|---|
| Taro Satoh | 33333333CCCCC CCC0000000000000 0000003 | 1245 | xxxxxxxxxxxx |
| Ichiro Tanaka | 44444444DDDDD DDD0000000000000 0000004 | 2356 | yyyyyyyyyyyy |
| ... | ... | ... | ... |

901   902   903   904

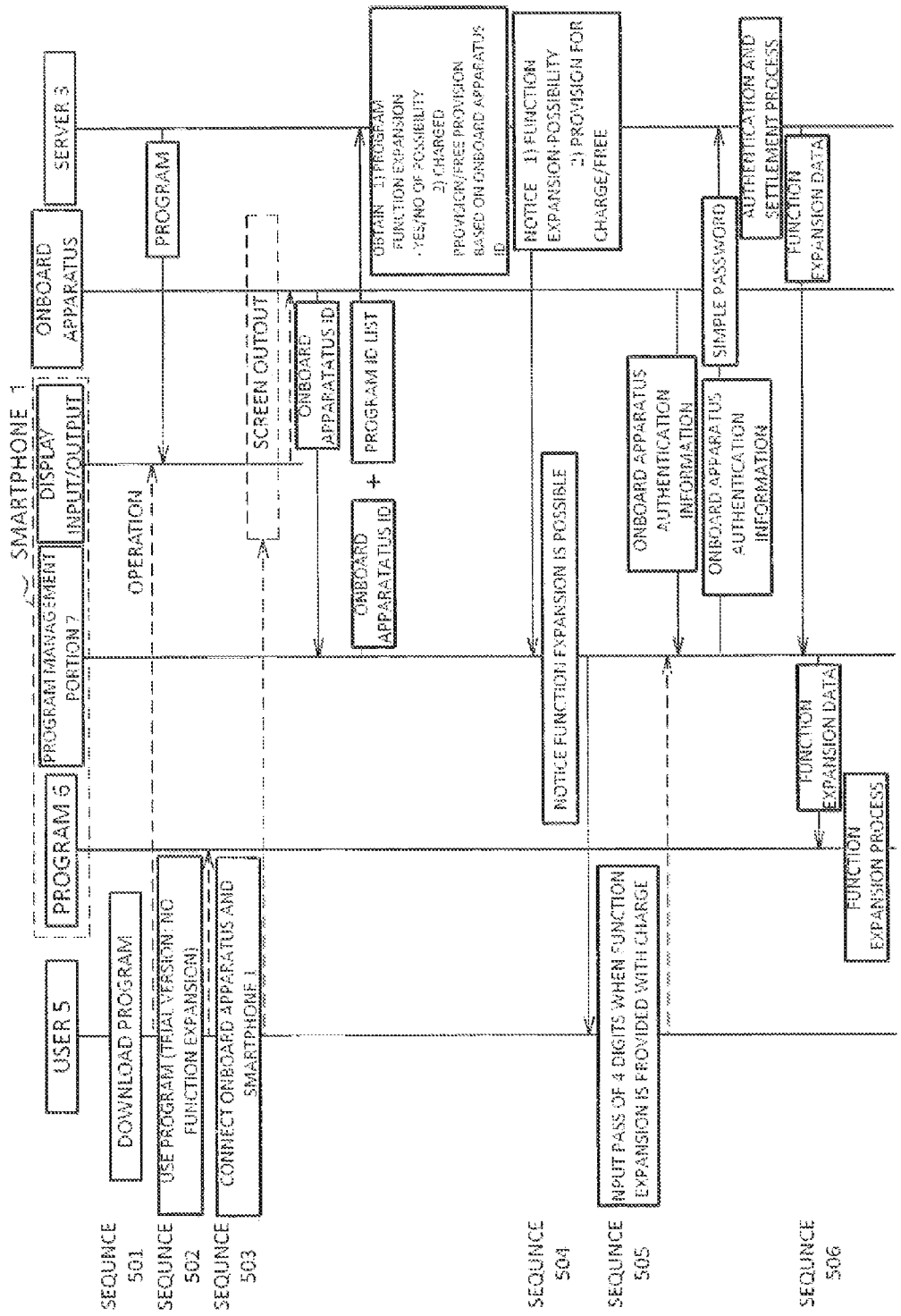

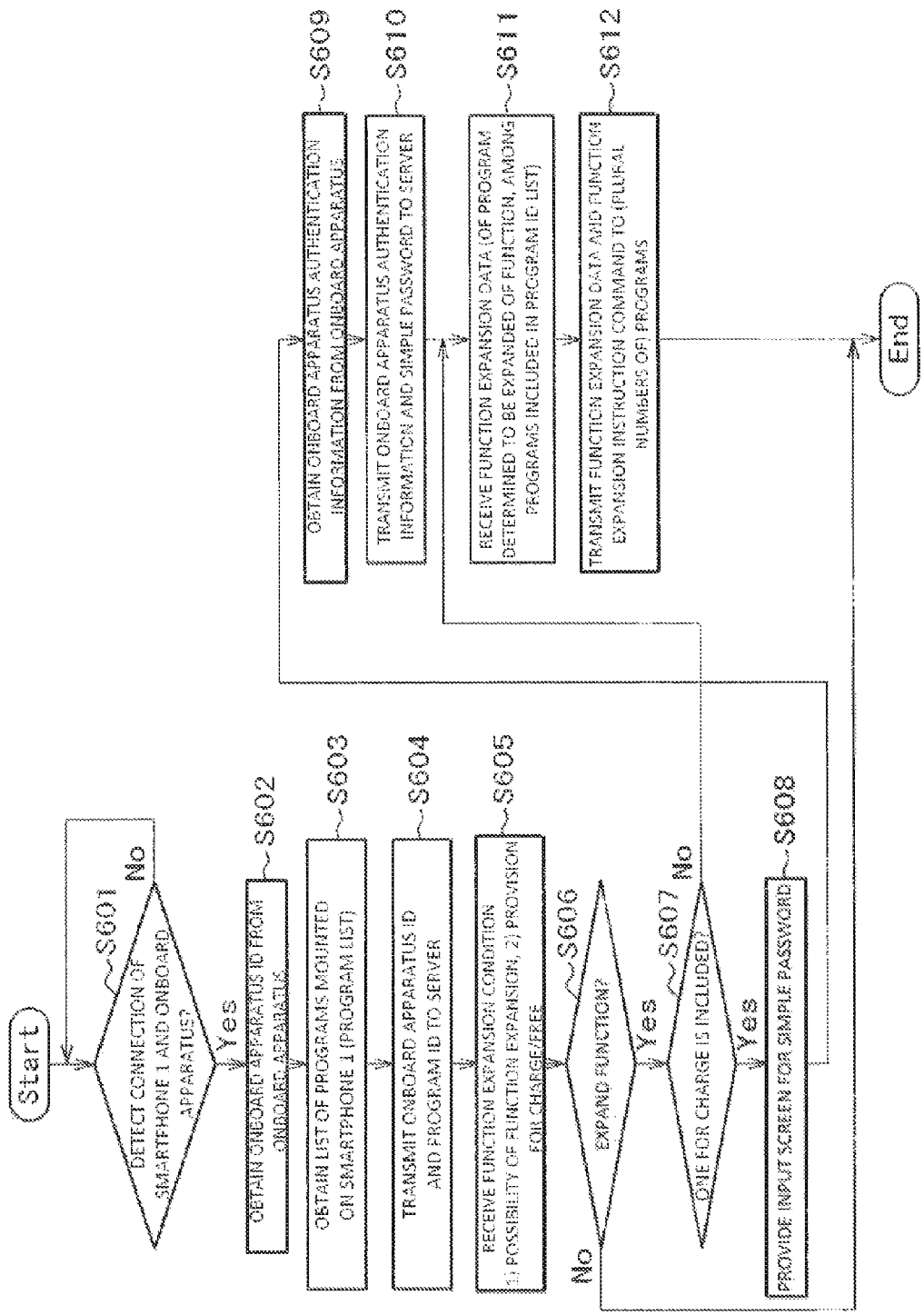

FIG. 14

| FUNCTION NAME | FUNCTION EXPANDABILITY | FOR CHARGED(○)/FREE(×) |
|---|---|---|
| FUNCTION "A" | ○ | ○ |
| FUNCTION "B" | × | |
| FUNCTION "C" | ○ | × |
| FUNCTION "D" | ○ | ○ |
| FUNCTION "E" | × | |

PROGRAM EXPANDING SYSTEM, SERVER FOR USE THEREIN, PROGRAM EXPANDING METHOD AND PROGRAM MANAGING PROGRAM

This application relates to and claims priority from Japanese Patent Application No. 2013-037216 filed on Feb. 27, 2013, the entire disclosure of which is incorporated herein by reference.

BACKGROUND OF THE INVENTION

The present invention relates to a program expanding system, a server for use therein, a program expanding method and a program managing program, and in particular, it relates to a program expanding system, being suitable to be applied for use of expanding functions of a portable or mobile telephone, upon basis of a function of a car navigation system, and also a server for use therein, a program expanding method, and a program managing program thereof.

Upon appearance of a system, in which plural numbers of terminals are cooperating with for providing services, there is devised a mechanism for providing the services, while one of the terminals uses resources of the other(s). For example, there is devised a mechanism for enabling the mobile terminal to put the resource(s) in practical use, such as, a memory capacity of an external apparatus, etc., for example, of a personal computer or the like.

As a system for the mobile terminal to utilize the memory capacity of the external apparatus, in this manner, there is disposed one, in which a wireless device residing application of a wireless device receives an application install package from a remote server through a wireless network, and it installs an external device application on the external device, with an on-demand method.

PRIOR ART DOCUMENTS

Patent Documents

[Patent Document 1] Japanese Patent Laying-Open of PCT application No. 2008-537452.

BRIEF SUMMARY OF THE INVENTION

In the Patent Document 1 mentioned above is described the method for installing the application of the other terminal through the one of the terminals. However, there is a problem that it is impossible to expand/exchange the function, which is provided by a single application for providing the same (or a similar kind) service, operable on the one of the terminals, in a system where the one of the terminals is connected with the other terminal(s), to be put in practical use.

Thus, no consideration is paid on an aspect of providing a mechanism for enabling expansion/exchange of the function(s) of the program under the condition of being used, in case when a user tries a program, which can be used on a single terminal, such as, a Smartphone, at one end, through downloading thereof when she/he does not carry that terminal, for example, when she/he is moving on a train, etc., and thereafter, when she/he connects that Smartphone to a terminal on an onboard apparatus, etc., for fitting the function equipped with on the terminal at a destination of connection (for example, a locator function (i.e., a function for outputting a high-accurate position information, by combining sensor information of a GPS sensor and a gyro sensor, etc.) and so on), at a predetermined timing.

Also, in the example mentioned above, no consideration is paid on providing a mechanism for enabling expansion/exchange of the function(s) of the program, depending on characteristics of the onboard apparatus of the destination of connection (i.e., being included in a contract of the program between a company manufacturing that onboard apparatus, or a company of an OEM (Original Equipment Manufacturer) of the onboard apparatus, etc.)

Also, no consideration is paid on noticing the fact that the function of the program be expandable/exchangeable depending on necessity thereof, when expanding/exchanging the program in such a manner.

Also, in case of expanding/exchanging the function of the program in such manner, no consideration is paid upon enabling to guide a user to purchase the program, through an easy operation, in particular, when the expansion is for charge.

The present invention, accomplished for dissolving such problem(s) as mentioned above, and an object thereof is to provide a program expanding system for enabling an information processor terminal to other information processor terminal(s), expanding/exchanging the function(s) of the program, by conducting authentication thereof, if it is necessary, upon basis of the function or the characteristics, including a form of contract of service provision between the companies, for other information processor terminal(s).

The program expanding system according to the present invention a program expanding system, wherein a first information processor terminal and a second information processor terminal, and a server are connected with, through a network, for expanding the function of the program to be executed on the first information processor terminal.

And, the first information processor terminal has a program for expanding function, and a program management portion for conducting a process of function expansion of the program, the second information processor terminal has an authentication information production processor portion for producing authentication information relating to the second information processor terminal, and the server has a function expansion condition obtaining portion for obtaining a function expansion condition of the program, a function expansion data distributing portion for distributing program function expansion data for expanding the function of the program to be executed on the first information processor terminal, and a function expansion condition table, on which the second information processor terminal and the condition relating to the function expansion of the program are related with or corresponded to each other.

A program management portion of the first information processor terminal transmits the information relating to the second information processor terminal and a program ID list, which are held by the first information processor terminal, to the server, when the first information processor terminal is connected with the second information processor terminal.

Next, the server obtains a possibility of function expansion of the program, which is indicated by the program ID list, and a condition relating to charge/free provision of the function expansion of the program, by referring to the function expansion condition table, upon basis of the program ID list, and transmits a result obtained, to the first information processor terminal.

Next, when receiving an input of conducting the function expansion of the program from the user, the first information processor terminal obtains second information processor terminal authentication information produced by an authentication information production processor portion, from the second information processor terminal, and transmits it to the server.

Next, the server receives authentication information relating to the second information processor terminal, and transmits function expansion data relating to the function expansion of the program, to the first information processor terminal, when succeeding the authentication thereof.

And, the first information processor terminal results to conduct the function expansion of the program, upon basis of the expansion data.

According to the present invention, it is possible to provide the program expanding system for enabling an information processor terminal to other information processor terminal(s), expanding/exchanging the function(s) of the program(s), by conducting authentication thereof, if necessary, upon basis of the function, or the characteristics, including the form of contract of providing service between the companies, for other information processor terminal(s).

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 6 is the view for showing an example of a function expanding condition table (the first);

FIG. 7 is the view for showing an example of the configuration of an onboard ID;

FIG. 8 is the view for showing an example of a user information table;

FIG. 9 is the sequence view of processes of the program expanding system, according to the first embodiment of the present invention;

FIG. 10 is the flowchart for showing processes in a program management portion 7 of the Smartphone 1;

FIG. 14 is the view for showing an example of a function expanding condition table (the second).

DETAILED DESCRIPTION OF THE PREFERRED EMBODIMENTS

Hereinafter, embodiments according to the present invention will be fully explained, by referring to one of FIGS. 1 to 14 attached herewith.

<Embodiment 1>

Hereinafter, a first embodiment according to the present invention will be fully explained, by referring to one of FIGS. 1 to 9.

First of all, explanation will be given on the structure of a program expanding system according to the first embodiment of the present invention, by referring to one of FIGS. 1 to 3.

Figure 1:
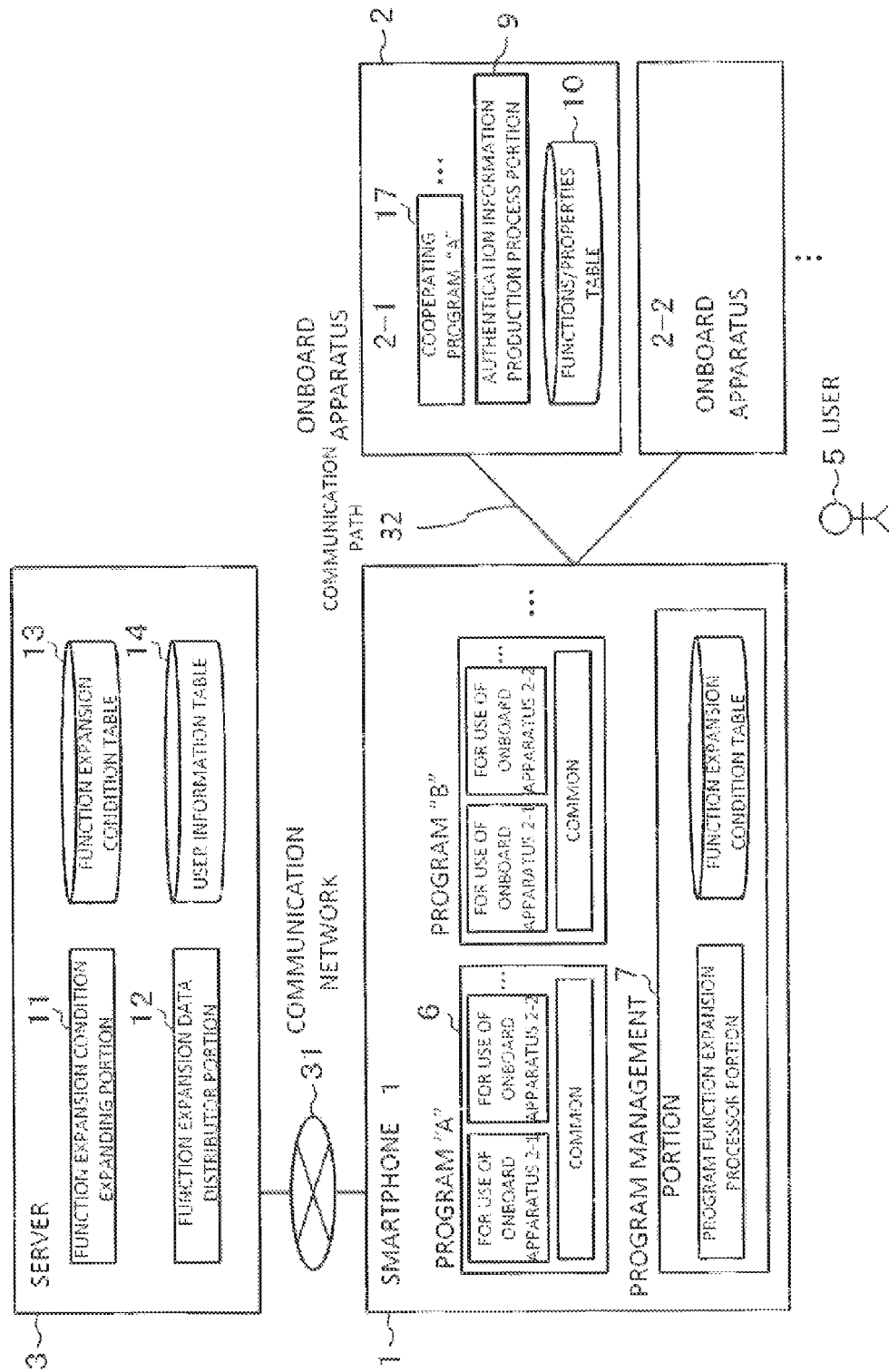
FIG. 1 is the function structure view of a program expanding system, according to a first embodiment of the present invention.

FIG. 1 is a function structure view of a program expanding system, according to a first embodiment of the present invention.

Figure 2:
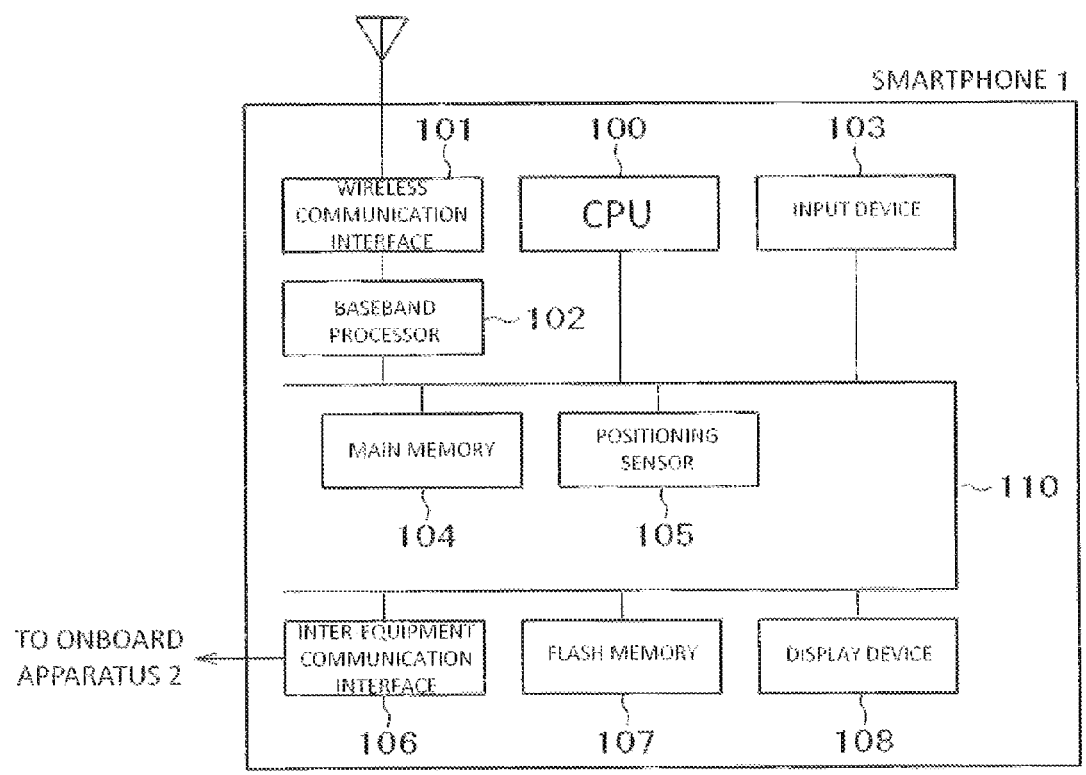
FIG. 2 is the hardware structure view of a Smartphone.

FIG. 2 is a hardware structure view of a Smartphone.

Figure 3:
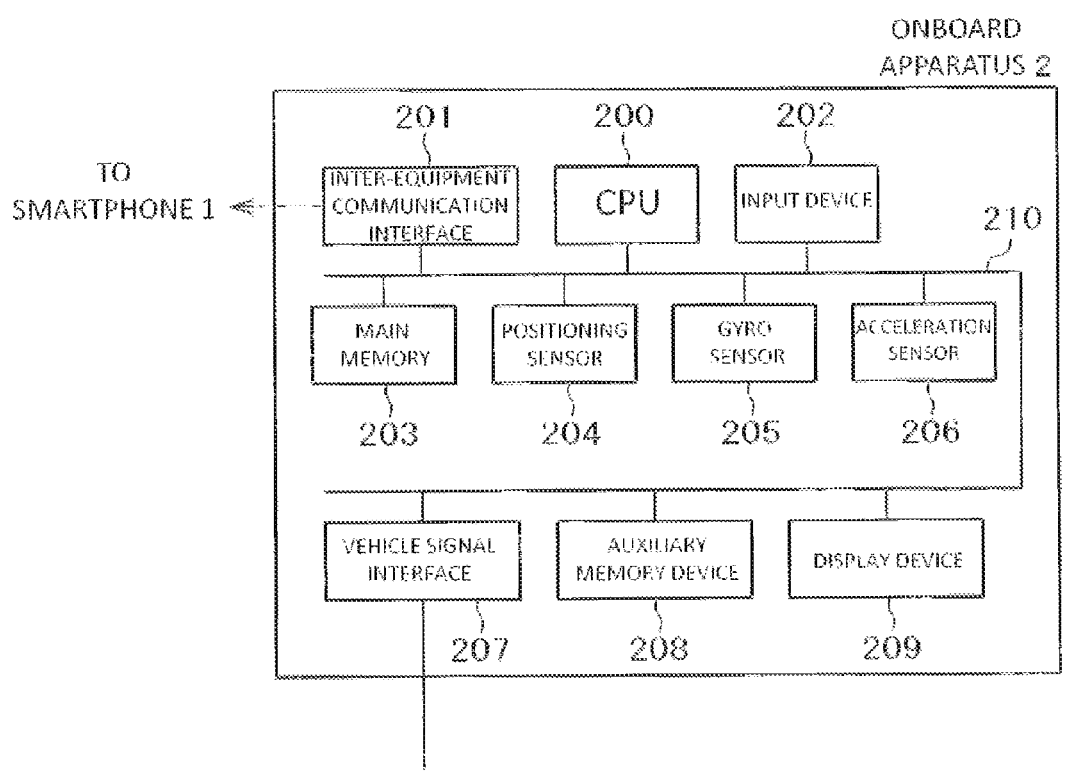
FIG. 3 is the hardware structure view of an onboard apparatus.

FIG. 3 is a hardware structure view of an onboard apparatus.

Figure 4:
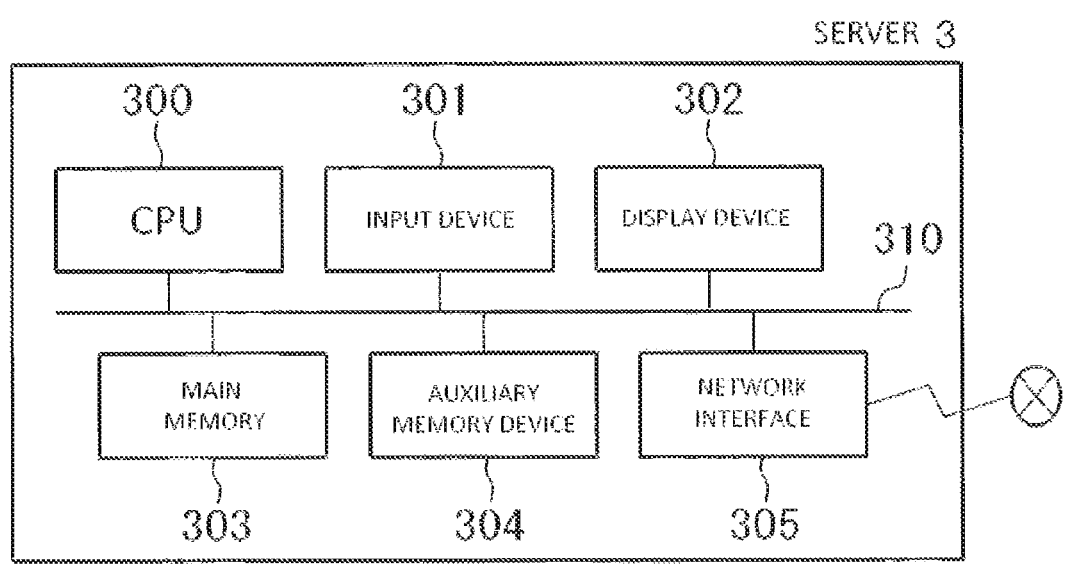
FIG. 4 is the hardware structure view of a server.

FIG. 4 is a hardware structure view of a server.

The program expanding system, according to the first embodiment of the present invention comprises a Smartphone 1, an onboard apparatus 2 and a server 3, as is shown in FIG. 1, and they are in a mode that the Smartphone 1 and the server 3 are connected with, through a communication network 31, and wherein the Smartphone 1 and the onboard apparatus 2 are connected with, through a channel (or communication path) 32.

The communication network 31 for connecting between the Smartphone 1 and the server 3 is made of, in normal, a wireless network, such as, 3G network, etc. The channel 32 for connecting between the Smartphone 1 and the onboard apparatus 2 is made of, in normal, may be a wired network, such as, a USB (Universal Serial Bus), etc., for example, or may be a wireless network, such as, Wi-Fi (Wireless Fidelity) network applying the IEEE 802.11 regulation therein, etc.

The Smartphone 1 comprises, as the function configuration thereof, at least one of more numbers of program(s) 6 operating on that terminal, a program management portion 7, for managing that/those program(s), and an onboard apparatus cooperation processor portion 8, for achieving a cooperation process with the onboard apparatus 2 through the channel 32.

The program management portion 7 has a program expanding process portion 71, for conducting processes for expanding the program, and a program ID table 72, for memorizing therein a unique program ID to identify the program.

The program expansion processor portion 71 executes the following processes; i.e., 1) obtaining functions/properties from the onboard apparatus 2; 2) transmitting the functions/properties to the server 3; 3) obtaining necessary information, for operating function expansion, from the server; 4) displaying that the function can be expanded, on a screen; 5) transmitting authentication information and/or transmitting information to conduct a purchasing of function expansion data (i.e., a plug-in program, etc.); and 6) receiving the function expansion data and expanding the function of the program, etc., while conducting data communication between the onboard apparatus 2 and the server 3.

The program 6 is a program for achieving each function of a program "A" and a program "B", etc., and is a program for achieving a displaying function of a locator on the Smartphone 1, for example. The program 6 is conducted through a program, which is operable in cooperation with plural kinds of programs differing in the functions/properties on the onboard apparatus 2 (i.e., for use in onboard apparatus 2-1, and for use in onboard apparatus 2-2, etc.), and a program (common), which is operable even when not being carried about, but without distinction of classification or the onboard apparatus 2.

The onboard apparatus 2 comprises a functions/properties memory portion table 10, and a cooperating program(s) 17.

An authenticate information produce processor portion 9 is a portion, for producing information for the server 3 to authenticate the onboard apparatus 2. A functions/properties table 10 is a table, for memorizing the functions/properties, which are owned by the onboard apparatus 2. The cooperating program 17 is a program for operating in cooperation with the program 6 of the Smartphone 1.

The server 3 comprises a function expansion condition obtainer portion 11, a function expansion condition distributor portion 12, a function expand condition table 13, and a user information memory table 14.

The function expand condition table 13 is a table, for memorizing therein an acceptance/denial of provision, depending on the functions/properties, which are owned by the onboard apparatus 2, and a condition, such as, being charge/free, etc.

The function expansion condition obtainer portion 11 obtains 1) possibility/impossibility of the function expansion, and 2) being charge/free, upon basis of the condition memorized in the function expand condition table 13, i.e., the functions/properties information of the onboard apparatus 2, which are received from the Smartphone 1.

The function expansion condition distributor portion 12 is a portion for distributing data of expanding/exchanging the function of a plug-in program, etc., for the Smartphone 1.

The user information memory table 14 is a table, for memorizing therein a user, who owns the onboard apparatus 2, a simple password for authenticating the user, and account information, such as, a credit card number of a card, which is owned by the user, etc.

The Smartphone 1 is constructed with, as is shown in FIG. 2, a CPU (Central Processor Unit) 100, a wireless communication interface 101, a baseband processor 102, an input device 103, a main memory 104, a positioning sensor 105, a wired communication interface 106, a flash memory 107, and a display device 108, each being connected with through a bus 110.

The CPU 100 is a unit for controlling each portion of the Smartphone 1, and for executing calculating/controlling of the program for expanding the program loaded on the main memory 104. The CPU 100 carries out various binds of processes, by reading the programs stored in the flash memory 106 into the main memory 102, and thereby executing them. Those programs and the data may be stored in the flash memory 107, in advance, or may be inputted from a memory medium, such as, a CD-ROM, etc., or may be downloaded from other apparatus, passing through a network. Or, the functions, which are achieved by those programs, may be achieved by hardware for exclusive use thereof.

The wireless communication interface 101 is an interface apparatus, for converting a signal of the baseband processor 102 into a high-frequency signal of wireless band, or on the other hand to convert the high-frequency signal of the wireless band into a signal of the baseband processor 102. The Smartphone 1 communicates between the server 3, by means of the communication network 31, such as, the internet, etc., through the wireless communication interface 101, and thereby conducting transmission of necessary information and/or downloading of data.

The baseband processor 102 is a processor for controlling modules relating to communication and/or conversation of the Smartphone 1.

The input device 103 is a device for the user 5 to operate the Smartphone 1 by her/his finger, such as, a button, a switch, a keyboard, a touch panel, etc., for example.

The main memory 104 is a memory device, for memorizing a program(s) memorized in the flash memory 107, temporarily, after loading thereof, or for memorizing work data therein.

The positioning sensor 105 is a sensor, for measuring a positioning of itself, which is indicated by the latitude and the longitude on the globe.

The wired communication interface 106 is an interface apparatus, for connecting with the onboard apparatus 2, so as to communicate data therebetween. The connecting method may be a wired connection, in accordance with a regulation, such as, a USB (Universal Serial Bus) or a HDMI (High-Definition Multimedia Interface), etc., for example, or it may be a wireless connection, in accordance with a regulation, such as, IEEE 802.11ba/b/g/n a Wi-Fi or Bluetooth®, etc.

The flash memory 107 is a non-volatile memory for storing a program(s) and/or data therein, being larger than a normal main memory 104 in the capacity thereof. The flash memory 107 is a memory device having a relatively large capacity, for memorizing various kinds of data therein, such as, a map DB, policy information, audio data, moving picture data, etc., and a program(s), such as, an application software, etc., as well.

The display device 108 is a device fee: displaying video information to the user, such as, a liquid crystal display or an organic EL (Electro-Luminescence) display, etc., and in general, is applied that having a screen of display size from 3 inches to 5 inches.

The onboard apparatus 2 comprises, as the hardware thereof, a CPU 200, an inter-equipment communication interface 201, an input device 202, a main memory 203, a positioning sensor 204, a gyro sensor 205, an acceleration sensor 206, a vehicle signal interface 207, and a display device 209, as is shown in FIG. 3, and wherein they are connected with through a bus 201.

The CPU (Central Processing Unit) 200 is a unit for calculation/control, i.e., for controlling each portion of the onboard apparatus 2, and for executing application software of the car navigation, which is loaded on the main memory 203.

The input device 202 is a device for the user to operate the onboard apparatus 2 by her/his finger, such as, a button, a switch, a keyboard, and/or a touch panel, etc., for example.

The main memory 203 is a semiconductor memory device, for storing therein a program(s) memorized in an auxiliary memory device 28, through loading thereof, temporally, and/or for memorizing work data.

The inter-equipment communication interface 201 is an interface for connecting with the Smartphone 1, and the regulation of the connection method thereof may be either wired/wireless one, similar to that of the inter-equipment communication interface 106 of the Smartphone 1.

The positioning sensor 204 is a sensor for measuring the position of itself, which is indicated by the latitude and the longitude on the globe.

The gyro sensor 205 is a sensor, for measuring an angle and/or an angular acceleration of the vehicle, on which it is mounted.

The acceleration sensor 206 is a sensor for measuring an acceleration of the vehicle, on which it is mounted.

The vehicle signal interface 207 is an interface for connecting a vehicle signal to an outside, and is able to take therein a running condition and/or an internal condition of the vehicle.

The auxiliary memory device 208 is a large capacity memory device for memorizing therein various kinds of data, such as, a map database, etc., and also application software of the car navigation, etc., and it may be a HDD (Hard Disk Drive) or a SSD (Solid State Drive).

The display device 209 is a device for displaying video information to the user 5, being made, such as, a liquid crystal display or an organic EL (Electro-Luminescence) display, etc., for example.

The server 3 comprises, as the hardware thereof, a CPU 300, an input device 301, a display device 302, a main memory 303, an auxiliary memory device 304, and a network interface 305, as is shown in FIG. 4, and wherein they are connected with through a but 310.

The CPU 300 controls each portion of the server 3, and it executes the program and processes data, which are stored in the auxiliary memory device 304, after loading it/them on the main memory 303.

The input device 301 is a device, being made of, such as, a keyboard or a mouse, etc., and from this input device, a manager inputs a command therein.

The display device 302 is a liquid crystal display or an organic EL (Electro-Luminescence) display, etc., for displaying thereon a monitor of an operation condition and/or an output result thereof.

The main memory 303 is a semiconductor memory device, for storing the program memorized in the auxiliary memory device 304 after loading thereof, and/or for memorizing work data therein.

The auxiliary memory device 304 is a memory device, such as, a HDD, etc., for storing data and a program(s) therein. In case of the server 3, the HDD may be connected in an array, thereby to build up a disk array.

The network interface 305 is an interface for connecting with the communication network 31, and with using this, the communication is conducted between an external apparatus.

Next, explanation will be given on an image of a series of application scenes of the program expanding system, according to the first embodiment of the present invention, by referring to FIG. 5.

Figure 5:
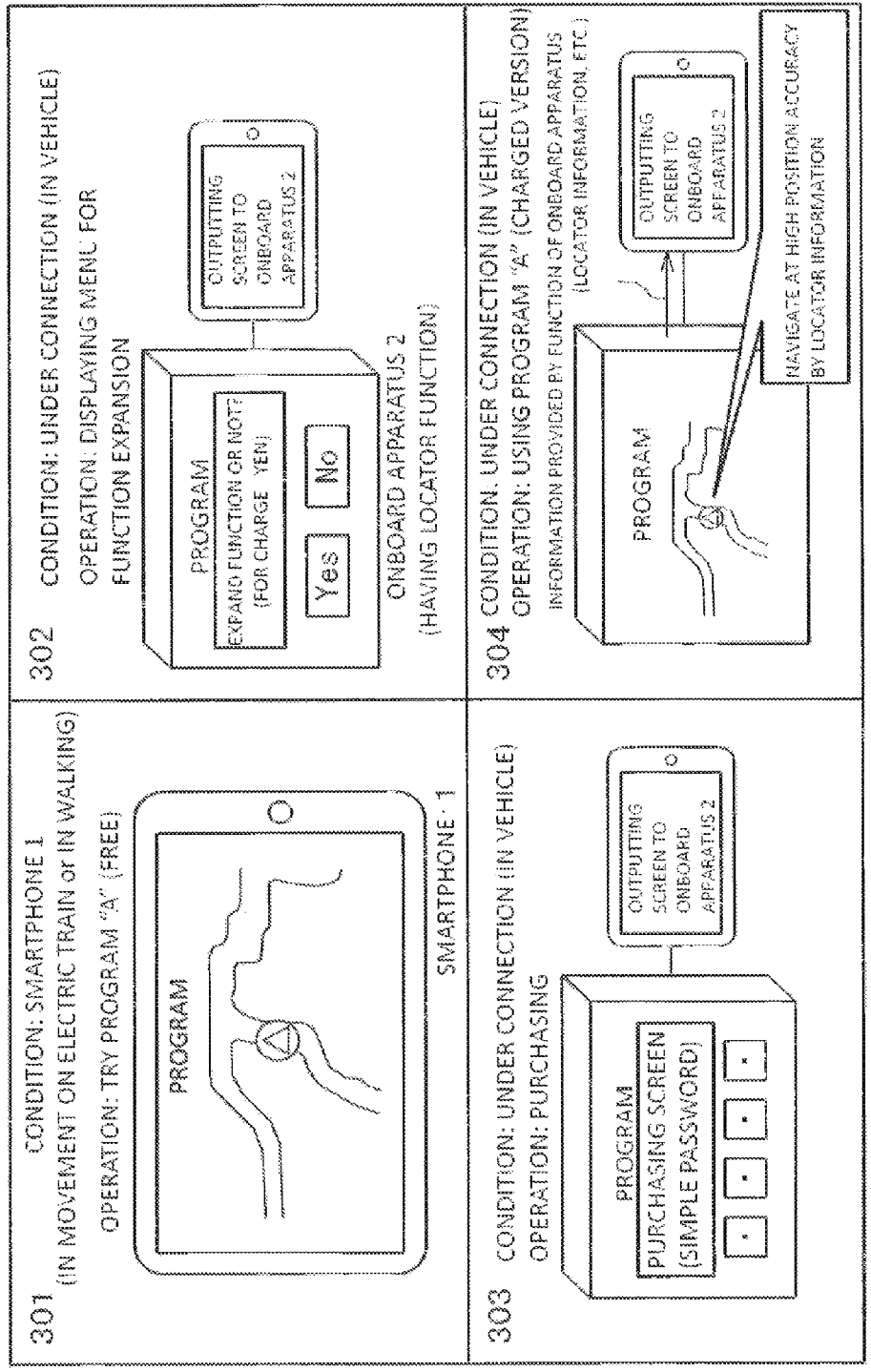
FIG. 5 is the view for explaining a series of images of application scenes of the program expanding system, according to the embodiment of the present invention.

FIG. 5 is a view for explaining a series of images of application scenes of the program expanding system, according to the embodiment of the present invention.

First of all, under the condition where the user 5 is using the Smartphone 1, alone, in an outside of the vehicle, such as, during a movement of riding on an electric train, or during walking, etc., she/he uses a program 6 (being assumed a free program among of programs "A") (scene 301).

Next, the user 5 connects the Smartphone 1 with the onboard apparatus 2 in an inside of the vehicle, and under the condition of outputting a screen of the Smartphone 1 to the onboard apparatus 2 (in this instance, a message, "in condition of outputting screen to onboard apparatus" is displayed on the Smartphone 1), the program management portion 7 of the Smartphone 1 asks the user if she/he wishes to buy function expanding data or not, upon receipt of a notice from the server, that the function is expandable fitting to the functions/properties of the onboard apparatus 2, and that expansion of the function is for charge (scene 302).

Next, when the user 5 responds "Yes", then the program management portion 7 of the Smartphone 1 requests the user 5 to input a simple password for purchasing the function expansion data, on the screen of the onboard apparatus 2 (scene 303).

And, the program 6 (including the program for providing an expansion function of the charged program "A", and a program(s) for use of the onboard apparatus 2, which is/are connected with a common program(s) shown in FIG. 1) provides a service, upon basis of the expansion function (scene 304).

Herein, explanation will be given on an example of the expansion function, in the application scene mentioned above.

1) Navigation Program (Receiving of Locator Information)

This is in the case where the program 6 of the Smartphone 1 is a navigation program.

The navigation program of the Smartphone 1, as a basic function, is assumed to have a navigation program, and it enables display of the location information, if alone. In the present embodiment; it expands the navigation program, thereby connecting with the onboard apparatus 2, and it receives the locator information. With this, the navigation program of the Smartphone 1 can refer the position information of high accuracy, which can be obtained by using the locator information owned by the onboard apparatus 2, and therefore enables conducting the navigation at high accuracy, with applying the position information of high accuracy of the function expansion data for use of the onboard apparatus 2.

However, in FIG. 5, although the display of the navigation program is conducted on the side of the onboard apparatus 2; however, it may be conducted on the side of the Smartphone 1, or on both of them.

In general, it can be considered that, for the user 5, a frequency of model changing of the Smartphone 1 is higher than that of the onboard apparatus 2; therefore, there can be obtained a merit that the display of the position information can be conducted by using the navigation program, while applying the power of the Smartphone 1, which is improved in the performance thereof.

2) Map Searching (Searching of Point of Interest)

In this example, the program 6 of the Smartphone 1 is a map displaying software, and it is utilized for searching a Point Of Interest.

For example, a place where the user 5 has an interest, such as, a restaurant or a sightseeing spot, etc., corresponds to the Point Of Interest mentioned herein. As the expansion function of the map displaying software, the user 5 displays the Point Of interest on the map on the display device, with using the map DB located on the server 3, when she/he connects the Smartphone 1 with the onboard apparatus 2. Also, when she/he does not connect the Smartphone 1 with the onboard apparatus 2, she/he connects the Smartphone 1 with the server 3, thereby displaying the Point Of Interest on the map on the display device, with using the map DB located on the server 3.

3) Use of Data Memorized in Onboard Apparatus 2

This is an example, for the user 5, to use the data memorized in the onboard apparatus 2. On the onboard apparatus 2, the trap data and service data are encoded and memorized in the auxiliary memory device 208 of the onboard apparatus 2. And, after transmitting authentication information to the server 3, when the authentication is "OK", the Smartphone 1 receives a decoding key from the server 3, and then decodes the data stored therein, i.e., using the data on the Smartphone 1, such as, displaying it on the display device 108, etc.

Next, explanation will be given on the details of data configuration to be applied in the program expanding system according to the present invention, by referring to one of FIGS. 6 to 8.

FIG. 6 is a view for showing an example of a function expanding condition table (the first).

FIG. 7 is a view for showing an example of the configuration of an onboard ID.

FIG. 8 is a view for showing an example of a user information table.

A function expansion condition table 13 is configured with fields, each being, such as, onboard equipment ID 701, a function expansion target program 702, and a charge/free 703, as is shown in FIG. 6.

The onboard equipment ID 701 is a filed for storing an ID for identifying the onboard apparatus 2, such as, a model of the onboard apparatus 2, a treatment (i.e., a car model, for which it is provided, a maker, and an area), and a unique ID. The configuration of the onboard equipment ID 701 will be explained in more details thereof, by referring to next FIG. 7.

The function expansion target program 702 is a field for storing a name of the program, which is the target of the function expansion on the Smartphone 2, and/or an identifier thereof.

The charge/free 703 is a field for storing a flag indicating that the function expansion of the program targeted is charged or free.

The server 3 determines the function expansion target program, being expandable in the function thereof, by brining the onboard apparatus ID, which is received from the Smartphone 1, and the value, which is described in the onboard equipment ID 701, into be matched with, and further referring to the field of the function expansion target program 702 corresponding to that.

For example, in FIG. 6 are shown the followings: i.e., for the Smartphone 1 connected with the onboard apparatus 2 of the kind/treatment, which is shown in a record 710, the function expansions of three (3) programs of those programs "A", "B" and "C" are allowed, and the function expansions of the programs "A", "B" and "C" are free. Also, it is shown that, for the Smartphone 1 connected with the onboard apparatus 2 of the kind/treatment, which is shown in a record 711, the function expansions of only two (2) programs "A" and "B" are allowed, and wherein the function expansion of the programs "A" is for charge, while the function expansion of the programs "B" is free.

A format of the onboard apparatus ID is made up with the followings: as is shown in FIG. 7, information relating to the model of the Smartphone 1 in digits from $1^{st}$ to $8^{th}$, information relating to the treatment in digits from $9^{th}$ to $16^{th}$, and a unique ID (a serial number) of the onboard apparatus in digits from $17^{th}$ to $32^{nd}$.

Herein, the treatment is information relating to the use and marketing of the onboard apparatus 2, such as, a model of vehicle, on which the onboard apparatus 2 is mounted, a maker of the vehicle (i.e., a company of destination of the treatment), an area to be a target of using (for each destination, such as, Japan, U.S.A., Europe, etc.)

Herein, in FIG. 6, for example, between the Smartphone 1 to be connected with onboard apparatus 2 of the model/destination, which is shown in the record 711, and the Smartphone 1 to be connected with the onboard apparatus 2 of the model/destination, which is shown in the record 712, since description in lines from the digits from the $1^{st}$ to $8^{th}$ are same to, and the models described therein are same to, then in both of them, the function expansion of the two (2) programs "A" and "B" is allowed. However, since both are different from in the description in digits from $9^{th}$ to $16^{th}$, i.e., differing in the company of the destination and the area, then such a control can be made that, the function expansion of the program "B" is allowed, for free, to the onboard apparatus 2, which is provided from one of the companies, but the function expansion is allowed, but for a charge, to the program "B", which is provided from the other company.

The user information memory table 14 is configured with a user ID 901, an onboard apparatus ID 902, a simple password 903 and a credit card number 904, as is shown in FIG. 8.

The user ID 901 is a field for storing an identifier for identifying the user 5, therein. The onboard apparatus ID 902 is a field for storing the onboard apparatus ID of the onboard apparatus 2, which the user owns, and the details of the format of the onboard apparatus ID are as explained in the above. The simple password 903 is a password for authentication when the function expansion of the program is charged. The credit card number 904 is a field for storing a number of a credit card, which is used for payment when the user 5 purchases.

However, herein, a reason of why it is called the "simple password" lies in an intention that the payment from an account of that credit card can be made, with the simple password, but without inputting the number 904 of the credit card, upon assumption that the user 5 operating that onboard apparatus 2 is a true owner of that credit card, since the onboard apparatus ID is transmitted to the server 3.

There is necessity of registering each of the information of the user information table 14, in advance, thereby storing it in the server 3.

Next, explanation will be given on processes of the program expanding system according to the first embodiment of the present invention, by referring to one of FIGS. 9 to 11.

FIG. 9 is a sequence view of processes of the program expanding system, according to the first embodiment of the present invention.

FIG. 10 is a flowchart for showing processes in a program management portion 7 of the Smartphone 1.

Figure 11A:
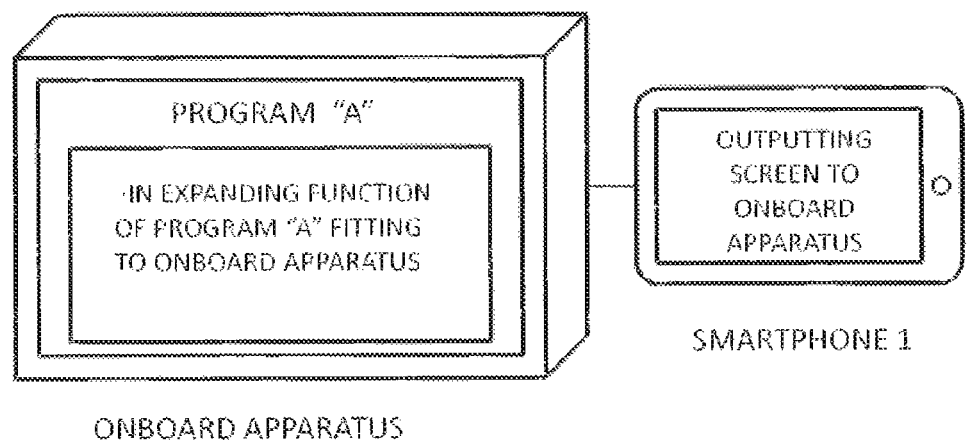
FIGS. 11A-11C are the views for showing screen images, which are outputted to the Smartphone 1 and the onboard apparatus 2 during expansion of program.
Figure 11B:
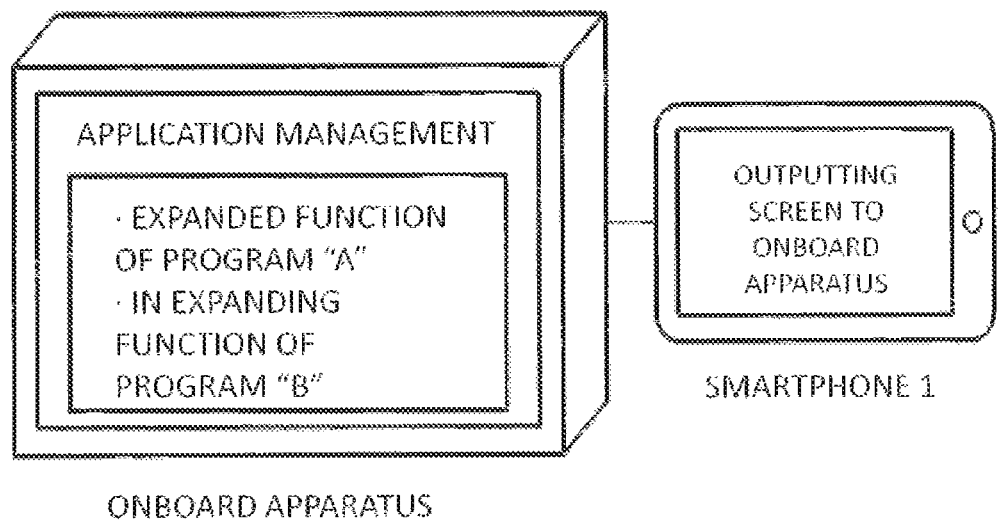
Figure 11C:
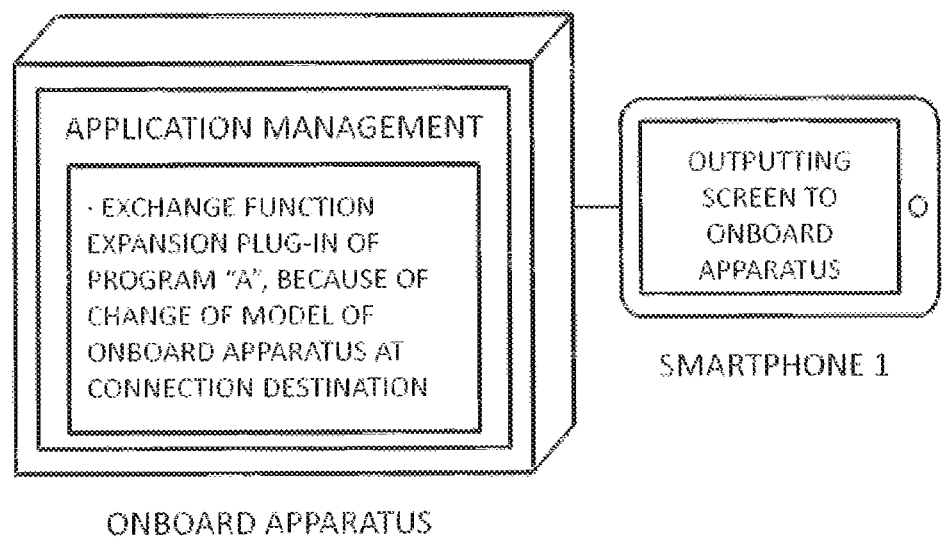

FIGS. 11A-11C are views for showing screen images, which are outputted to the Smartphone 1 and the onboard apparatus 2 during expansion of program.

First of all, through an operation of the Smartphone by the user 5, the program 6 is downloaded from the server 3, to be stored in the Smartphone 1 (sequence 501).

Next, the user 5 uses the program 8 (sequence 502). Herein, it is assumed that the program is that of a trial version, and therefore has no function expansion. And, it is also assumed that it also includes the common program(s) shown in FIG. 1.

Next, the user 5 connects the Smartphone 1 with the onboard apparatus 2, through the wired communication path 32, such as, the USB, etc., or the wireless communication path 32, such as, the Bluetooth® or the Wi-Fi, etc. (sequence 503). In this instance, through those communication paths, the screen of the Smartphone 1 is outputted to the onboard apparatus 2, and the operation information of the user 5 on the onboard apparatus 2 is transmitted to the Smartphone 1. The Smartphone 1 controls the program 6 and/or the program management portion 7 upon the operation information. However, the user 5 operates the onboard apparatus 2 by means of the input device 202 thereof, in the example shown in this FIG. 11; however, since what actually operates is the program of the Smartphone, therefore this is shown in such a manner, in also the example shown in FIG. 11.

The program management portion 7 obtains the onboard apparatus ID of the onboard apparatus 2 from that onboard apparatus, when detecting the connection thereof.

Next, the program management portion 7 transmits the onboard apparatus ID, and a list of program ID, for identifying each of plural numbers of programs, including the program 6, which is managed by the program management portion, etc., to the server 3.

The server 3 obtains 1) yes/no of a possibility of expanding the program function, and 2) difference of being free provision/charged provision, by referring to the function expansion condition table 13, while obtaining the information relating to the functions/properties/company and/or area of destination, in the function expansion condition obtaining portion 11.

The server 3 notices the obtained information of 1) and 2) to the program management portion 7 of the Smartphone 1.

The program management portion 7 of the Smartphone 1, upon receipt of this notice, notices that the function can be expanded, through screen/voices to the user 5 (sequence 504). This notice may be that of displaying the pop-up menu on the screen.

The program management portion 7 of the Smartphone 1 provides an input screen for the simple password to the user 5, if the function expansion of the program is for charge (sequence 505). The simple password may be a password made of four (4) digits of alphanumeric characters, as is shown by a scene 303 in FIG. 5.

The user inputs the simple password, in accordance with that.

The program management portion 7 of the Smartphone 1 obtains onboard apparatus authentication information for the server to authenticate the onboard apparatus 2, from that onboard apparatus 2.

Herein, the onboard apparatus authentication information may be a unique identifier of the onboard apparatus 2 or a unique secret information, or information, which can be obtained temporally, by converting it by a random number, etc. For example, the information is applied as the onboard apparatus authentication information, which can be obtained through conversion of an hour and a second at that time, the onboard apparatus ID, and the information produced by inputting the onboard apparatus password, by a hash function.

Next, the program management portion 7 of the Smartphone 1 transmits the onboard apparatus authentication information and the simple password to the server 3.

The server 3 conducts the authentication and a settlement process by means of the information received. Thus, the server 3 authenticates the user 5 by the onboard apparatus authentication information and the simple password, which are memorized in the user information memory table 14, and conducts the settlement process with applying an accounting number, such as, the credit card number, etc. When the authentication and the settlement process are conducted, normally, then the server transmits the function expansion data to the program management portion 7. The function expansion data includes therein a program ID of the program, in which this is practiced, for identifying the program to be expanded on the side of the Smartphone 1.

Next, the program management portion 7 identifies the program 6, which uses the function expansion data therein, by means of the program ID, and transmits the function expansion data to be applied in that program 6 to the Smartphone 1 (sequence 506).

The Smartphone 1 receives the function expansion data, and conducts a function expansion process to the program 6.

In the function expansion process of the program 6, not receiving the function expansion data, newly, but the function data for use of each of the onboard apparatus 2 may be activated, which is already held by the program 6.

When conducting the function expansion process of the program 6, such a screen may be presented to the user that indicates a progress of the function expansion of the program, as shown in FIGS. 11A and 11B.

Also, in case where an onboard apparatus 2', differing from the onboard apparatus 2 in the kind thereof, which is connected at that time, and where the program 6 already installed function expansion data/plug in for use of the onboard apparatus 2', in the past, the function expansion process mentioned above may be conducted while presenting such a screen as shown in FIG. 11C to the user 5.

Next, when the Smartphone indicates the process of the program management portion 7, it is as is shown in FIG. 10.

First of all, the program management portion 7 detects that the Smartphone 1 and the onboard apparatus 2 are connected with (S601).

Next, the program management portion 7 obtains the onboard apparatus ID from the onboard apparatus 2 (S602). The data format of the onboard apparatus ID is as was already shown in FIG. 7.

Next, the program management portion 7 obtains a list (i.e., a program ID list) of pleural numbers of programs, which are mounted on the Smartphone 1 and to be added/deleted during the time of installing/uninstalling of the program, from the program ID table 72 of the Smartphone 1 (S603).

Next, the program management portion 7 transmits the onboard apparatus ID and the program ID list to the server (S604).

The server 3 refers to the condition, which is described in the function expansion target program 702 and the charge/free 703 corresponding to the onboard apparatus ID, from among the function expansion condition table 13 shown in FIG. 6.

Herein, the server 3 obtains the possibility of the function expansion relating to that program, by comparing the program ID list received with the description of the function expansion target program 702 of the function expansion condition table 13, and further the information of charged provision or free provision, by referring to the condition described in the charge/free 703.

The server 3 transmits the information obtained (i.e., if the program described in the program ID list is 1) expandable of the function thereof, or 2) difference between free/charge) to the Smartphone 1.

The program management portion 7 receives a result of determination (S605).

The program management portion 7 completes the process, when no such a description is made that there is a program being expandable of the function thereof in the result or determination (S606).

In case of other than that, the process proceeds to a next S607.

The program management portion 7 proceeds to a next step S608, when detecting that the charged program is included in the result of determination, but to a step S611 when detecting not (S607).

The program management portion 7 presents an input screen for the simple password to the user 5, and receives the input made by the user 5 (S608).

Next, the program management portion 7 obtains the onboard apparatus authentication information from the onboard apparatus 2 (S609).

Herein, the onboard apparatus authentication information is the information for authenticating the onboard apparatus 2, which is produced from a variable value of a random number, etc., and/or the secret data unique to the onboard apparatus 2, etc.

Next, the program management portion 7 transmits the onboard apparatus authentication information and the simple password to the server 3 (S610). Herein, the simple password may be transmitted to the server 3, after being converted by an encryption function or a hush function, etc., together with the above-mentioned variable value and secret data, etc., for producing the onboard apparatus authentication information and that information mentioned above.

Next, the program management portion 7 receives the function expansion data of the program, expansion of which is determined, among from the programs included in the program ID list, from the server 3 (S611).

The program management portion 7 transmits the function expansion data to plural numbers or a single number of programs, together with a function expansion instruction command (S612).

However, though the processes mentioned above is explained to be processed by the program management portion 7, but those processes may be controlled to be executed within an inside of each program 6.

<Embodiment 2>

Hereinafter, explanation will be given in a second embodiment of the present invention, by referring to one of FIGS. 12 to 14.

In the program expanding system according so the first embodiment of the present invention, the expandability of the function for the program and the difference between the charge/free are determined on the server 3, and if the function of the program is expandable, then it is transmitted from the server 3 to the smartphone 1.

In the present embodiment, on the contrary to the above, all of the information relating to the functions for the onboard apparatus 2 is transmitted from the server 3, collectively, thereby asking the expandability of the function corresponding, on the Smartphone 1.

Figure 12:
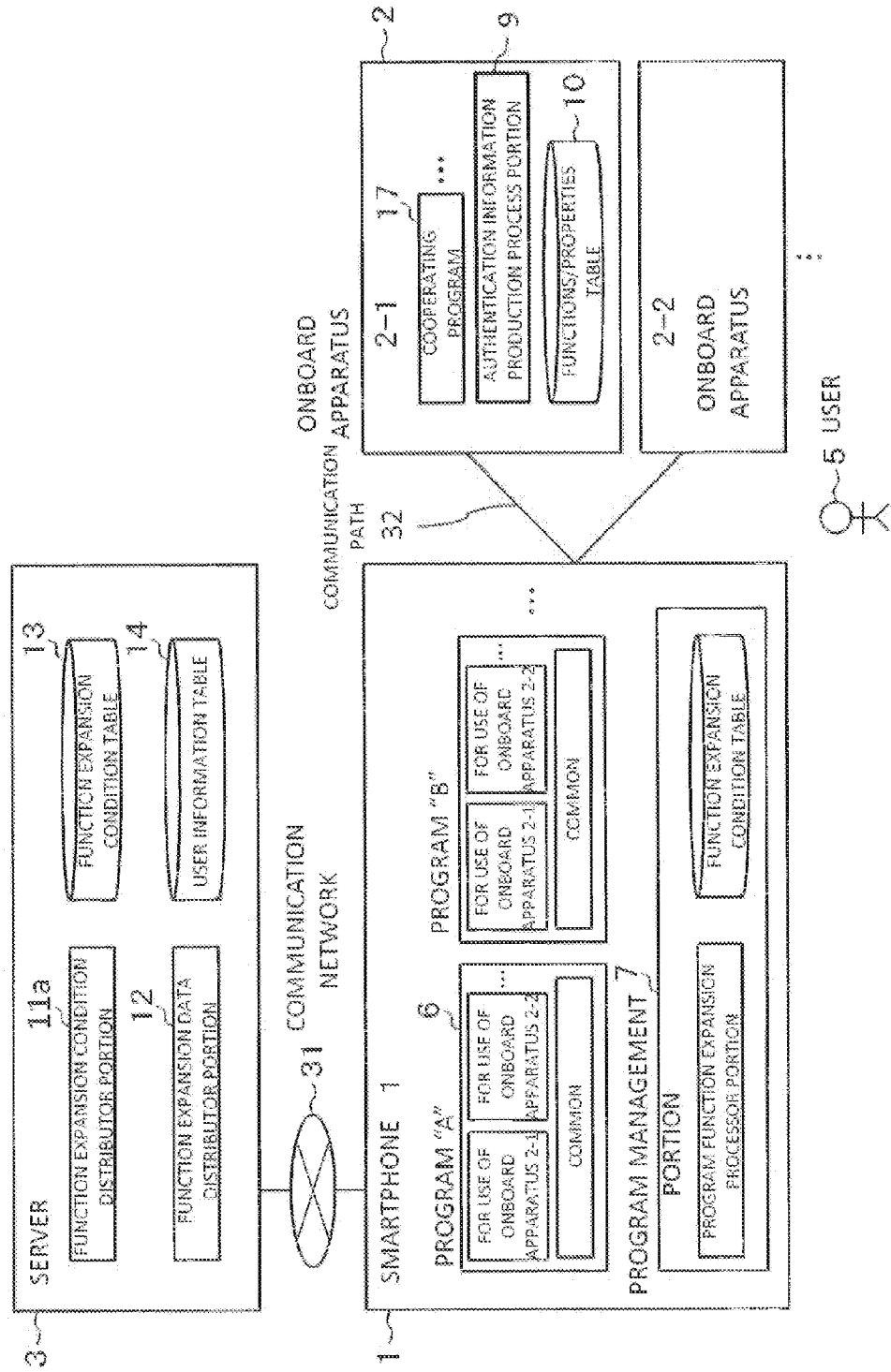
FIG. 12 is the function structure view of the program expanding system, according to a second embodiment of the present invention.

FIG. 12 is a function structure view of the program expanding system, according to a second embodiment of the present invention.

Figure 13:
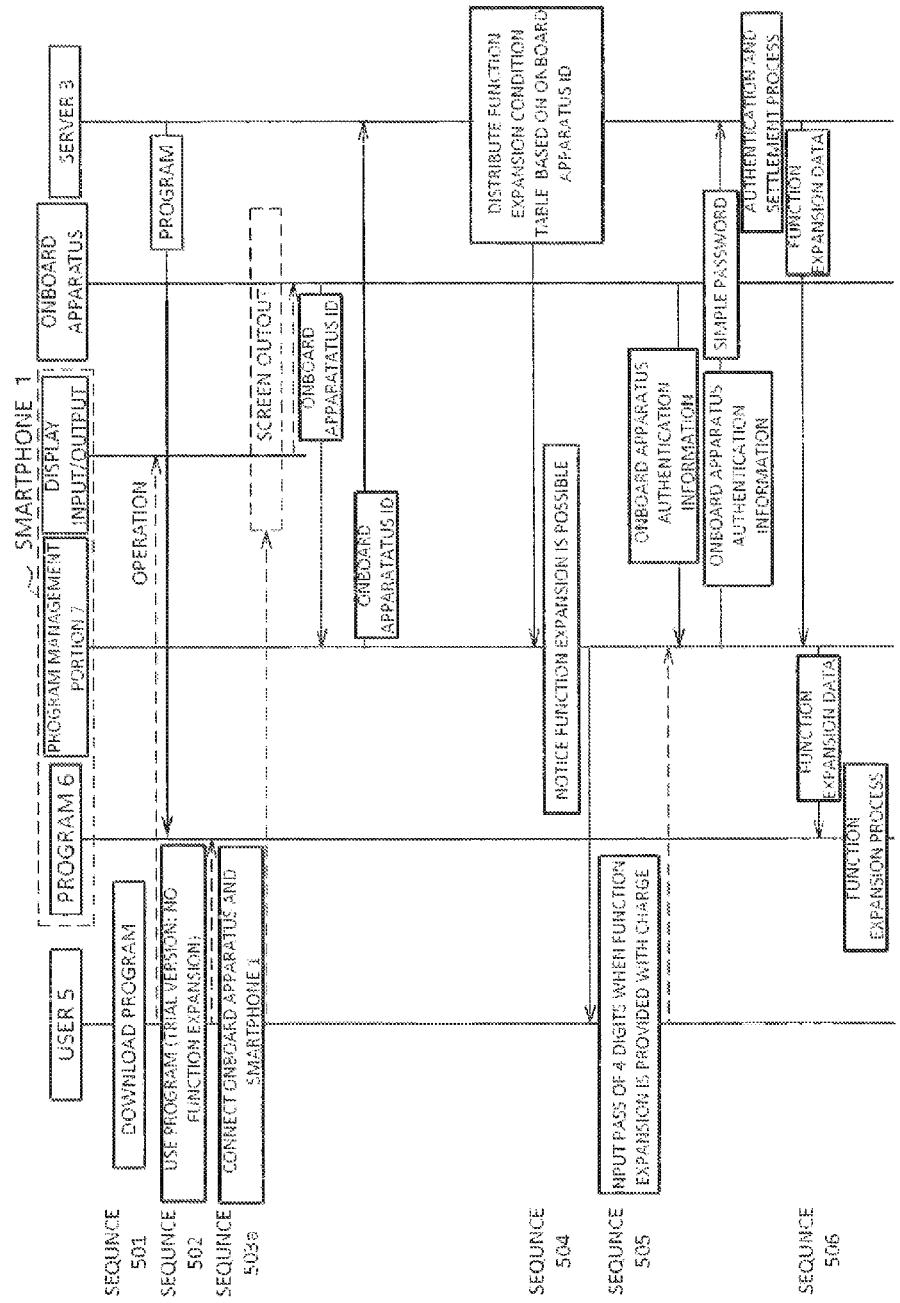
FIG. 13 is the sequence view of processes of the program expanding system, according to the second embodiment of the present invention.

FIG. 13 is a sequence view of processes of the program expanding system, according to the second embodiment of the present invention.

FIG. 14 is a view for showing an example of a function expanding condition table (the second).

In the system configuration of the present invention, as is shown in FIG. 12, the function expansion condition obtaining portion 11 shown in FIG. 1 is replaced by a function expansion condition distributing portion 16.

The function expansion condition distributor portion 16 is a portion for distributing a function expansion condition table 13a shown in FIG. 14 to the Smartphone 1.

Also, the function expansion condition table 13 is replaced by the function expansion condition table 13a shown in FIG. 14.

It is same that the function expansion condition table 13a is also a table for memorizing possibility/impossibility of provision depending on the functions/properties, which is owned by the onboard apparatus 2, and the condition of charge/free, etc., to that of the function expansion condition table 13 of the first embodiment.

The function expansion condition table 13a is configured with each of fields, as is shown in FIG. 14, a function name 710, an expandability of function 711, and a charge/free 712.

The function name 710 is a field for storing a title or name of the function(s) therein, which is/are provided on the onboard apparatus 2.

The expandability of function 711 is a field for storing a flag therein, indicative of if the function described in the function name 710 is expandable or not.

The charged/free 712 is a filed for storing a flag therein, indicative of if it is for charge or free, when expanding the function, which is described in the function name to have expandability of the function thereof. However, if having no expandability of the function, then this field has no meaning.

Next, explanation will be given on the processes of the program expanding system according to the second embodiment of the present invention, by referring to Sig. 13.

The processes shown in FIG. 13 differ from, in a portion of a sequence 503a, comparing to the sequence 503 shown in FIG. 9.

In the sequence 503a, it is same that the program management portion 7 obtains the onboard apparatus ID of the onboard apparatus 2 from the onboard apparatus 2, when detecting the connection thereof after the user 5 connects the Smartphone 1 with the onboard apparatus 2.

Next, the program management portion 7 transmits only the onboard apparatus ID to the server 3.

The server 3 takes out the function expansion condition table 13a corresponding to the onboard apparatus ID, and transmits it to the program management portion 7 of the Smartphone 1.

The program management portion 7 of the Smartphone 1, after making a search on an expandable function of the onboard apparatus 2, and thereby giving a notice the function expansion to the user 5, it displays a screen of asking if the expansion should be made or not of a scene 302 shown in FIG. 5, or a screen for inputting the simple password of a scene 303 if the function expansion is charged. The processes of the sequences 505 and 506 are same to those of the first embodiment shown in FIG. 9.

Within the present embodiment, even in case where there are two (2) or more numbers of the functions expandable (for example, the function "A", the function "B" and the function "C", in the example shown in FIG. 14), for the user, it is possible to expand those, collectively, by only one (1) of communication.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A program expanding system comprising:
a first information processor terminal;
a second information processor terminal communicatively connected to the first information processor terminal; and
a server communicatively connected to the first information processor terminal through a communication network;
wherein the first information processor terminal is configured to:
connect to the second information processor terminal,
receive an apparatus authentication information from the second information processor terminal,
transmit the apparatus authentication information and a list of programs comprising a program identifier for one or more programs installed on the first information processor terminal to the server;
receive a response from the server that indicates that program function expansion is available free of charge, available for a charge or not available for each of the one or more programs installed on the first information processor terminal,
display a screen asking if the function of the program should be expanded, if the received response indicates that the program expansion function is available for a charge or if the received response indicates that the program expansion function is available free of charge;

prompt a user to enter a password, if the received response indicates that the program expansion function is available for a charge; and perform the program function expansion function on the second information processor terminal, if the password is correct or program function expansion is available free of charge;

wherein the second information processor terminal is configured to apply an encryption function or a hash function to the information relating to the second information processor terminal by applying sensor data and a variable value and/or secret data unique to an onboard apparatus to generate a unique key.

2. The program expanding system, as described in claim 1, wherein the authentication information is produced based on the unique key.

3. The program expanding system, as described in claim 1, wherein the first information processor terminal is further configured to perform the program function expansion function for a plurality of programs.

4. The program expanding system, as described in claim 1, wherein the program function expansion comprises performing functions that could not be performed on the first information processor terminal alone.

5. A program expanding system comprising
a first information processor terminal;
a second information processor terminal communicatively connected to the first information processor terminal; and
a server communicatively connected to the first information processor terminal through a communication network;
wherein the second information processor terminal is configured to:
produce authentication information by applying an encryption function or a hash function to the information relating to the second information processor terminal based on sensor data and a variable value and/or secret data unique to an onboard apparatus;
wherein the server is configured to:
transmit a function expansion condition table for a plurality of programs in response to information transmitted from the first information processor terminal, wherein the function expansion table comprises an indication of whether program function expansion is available free of charge, available for a charge or not available;
wherein the first information processor terminal is configured to:
transmit the information relating the second information processor terminal to said server, when it is connected with said second information processor terminal,
obtain the authentication information of the second information processor terminal transmit the authentication information and a list of programs comprising a program identifier for one or more programs installed on the first information processor terminal to the server,
receive the function expansion condition table from the server,
display a screen asking if the function of the program should be expanded, if the function expansion condition table indicates that the program expansion function is available for a charge or if the function expansion condition table indicates that the program expansion function is available free of charge,
prompt a user to enter a password, if the function expansion condition table indicates that the program expansion function is available for a charge, and perform the program function expansion function on the second information processor terminal, if the password is correct or program function expansion is available free of charge.

6. The program expanding system, as described in claim 5, wherein the program function expansion comprises performing functions that could not be performed on the first information processor terminal alone.

7. A server connected to a first information processor terminal through a network comprising:
a function expansion condition portion, which is configured to obtain a function expansion condition of a program, based on information transmitted from the first information processor terminal;
a function expansion data distributor portion, which is configured to distribute program function expansion data for expanding the function of the program to be executed on the first information processor terminal;
and a function expansion condition table configured to store the function expansion condition, wherein the function expansion condition includes an indication of whether program function expansion is available free of charge, available for a charge or not available for a plurality of programs;
a wherein the server is configured to:
receive authentication information from a second information processor terminal, and
transmit the function expansion data to the first information processor terminal when succeeding the authentication thereof;
wherein the first information processor terminal is configured to:
transmit the authentication information and a list of programs comprising a program identifier for one or more programs installed on the first information processor terminal to the server,
receive the function expansion condition table from the server,
display a screen asking if the function of the program should be expanded, if the function expansion condition table indicates that the program expansion function is available for a charge or if the function expansion condition table indicates that the program expansion function is available free of charge,
prompt a user to enter a password, if the function expansion condition table indicates that the program expansion function is available for a charge, and
perform the program function expansion function on the second information processor terminal, if the password is correct or program function expansion is available free of charge;
wherein the second information processor terminal is configured to apply an encryption function or a hash function to the information relating to the second information processor terminal by applying sensor data and a variable value and/or secret data unique to an onboard apparatus.

8. The server of claim 7, wherein the program function expansion comprises performing functions that could not be performed on the first information processor terminal alone.

9. A method for expanding one or more functions of one or more programs to be executed on a first information processor terminal comprising
generating authentication information, by a second information processor terminal, by applying an encryption function or a hash function to information relating to the second information processor terminal based on sensor data and a variable value and/or secret data unique to an onboard apparatus;

transmitting, by first information processor terminal, the authentication information for the second information processor terminal and a program ID list of programs installed on the first information processor terminal to a server;

receiving, by the server, the authentication information for the second information processor terminal and the program ID list;

transmitting, by the server, a response that indicates that program function expansion is available free of charge, available for a charge or not available for each of the programs installed on the first information processor;

receiving, by the first information processor, the response;

displaying, by the first information processor terminal, a screen asking if the function of the program should be expanded, if the response indicates that the program expansion function is available for a charge or if the response indicates that the program expansion function is available free of charge, prompting, by the first information processor terminal, a user to enter a password, if the response indicates that the program expansion function is available for a charge, and performing, by the first information processor terminal, the program function expansion function on the second information processor terminal, if the password is correct or program function expansion is available free of charge.

10. The method of claim 9, wherein the program function expansion comprises performing functions that could not be performed on the first information processor terminal alone.

11. A method for expanding a function of a program to be executed in a first information processor terminal, which is connected with a second information processor terminal and a server through a network, comprising:

generating authentication information, by the second information processor terminal, by applying an encryption function or a hash function to information relating to the second information processor terminal based on sensor data and a variable value and/or secret data unique to an onboard apparatus;

transmitting, by the first information processor terminal, the authentication information for the second information processor terminal and a program ID list including an ID for one or more programs installed on the first information processor terminal, to the server;

receiving, by the first information processor terminal, function expansion condition information from said server, wherein the function expansion condition information includes an indication that program function expansion is available free of charge, available for a charge or not available for each program;

displaying, by the first information processor terminal, a screen asking if the function of the program should be expanded, if function expansion condition information indicates that the program expansion function is available for a charge or if the function expansion condition information indicates that the program expansion function is available free of charge;

prompting, by the first information processor terminal, a user to enter a password, if the function expansion condition information indicates that the program expansion function is available for a charge; and performing, by the first information processor terminal, the program function expansion function on the second information processor terminal, if the password is correct or program function expansion is available free of charge.

12. The method of claim 11, wherein the program function expansion comprises performing functions that could not be performed on the first information processor terminal alone.

13. A method for expanding a function of a program to be executed in a first information processor terminal, which is connected with a second information processor terminal and a server through a network, comprising:

transmitting, by the first information processor terminal, receiving, by the first information processor terminal, a function expansion condition table from the server, wherein the function expansion table comprises an indication of whether program function expansion is available free of charge, available for a charge or not available;

generating authentication information, by the second information processor terminal, by applying an encryption function or a hash function to information relating to the second information processor terminal based on sensor data and a variable value and/or secret data unique to an onboard apparatus;

obtaining, by the first information processor terminal, the authentication information for the second information processor terminal;

transmitting, by the first information processor terminal, the authentication information and a list of programs comprising an identifier for one or more programs installed on the first information processor terminal to the server;

transmitting, by the server, the function expansion condition table in response to receiving the authentication information and the list of programs and displaying, by the first information processor terminal, a screen asking if the function of the program should be expanded, if function expansion condition information indicates that the program expansion function is available for a charge or if the function expansion condition information indicates that the program expansion function is available free of charge;

prompting, by the first information processor terminal, a user to enter a password, if the function expansion condition information indicates that the program expansion function is available for a charge; and performing, by the first information processor terminal, the program function expansion function on the second information processor terminal, if the password is correct or program function expansion is available free of charge.

14. The method of claim 13, wherein the program function expansion comprises performing functions that could not be performed on the first information processor terminal alone.

* * * * *